US006308667B1

(12) United States Patent
Tsai et al.

(10) Patent No.: US 6,308,667 B1
(45) Date of Patent: Oct. 30, 2001

(54) ACTUATOR FOR ENGINE VALVE WITH TOOTH AND SOCKET ARMATURE AND CORE FOR PROVIDING POSITION OUTPUT AND/OR IMPROVED FORCE PROFILE

(75) Inventors: Hong Tsai, Farmington Hills; Youqing Xiang, Canton, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/559,448

(22) Filed: Apr. 27, 2000

(51) Int. Cl.[7] .................................. F01L 9/04; F16K 31/06

(52) U.S. Cl. ...................................... 123/90.11; 251/129.1; 251/129.16

(58) Field of Search .................... 123/90.11; 251/129.01, 251/129.1, 129.15, 129.16

(56) References Cited

U.S. PATENT DOCUMENTS

| | | |
|---|---|---|
| 3,770,014 | 11/1973 | Limberg . |
| 5,031,661 | 7/1991 | Feuz . |
| 5,056,754 | 10/1991 | Graner et al. .................. 251/129.16 |
| 5,110,087 | 5/1992 | Studtmann et al. ............ 251/129.16 |
| 5,131,624 | 7/1992 | Kreuter et al. .................. 251/129.18 |
| 5,222,714 | 6/1993 | Morinigo et al. ............... 251/129.16 |
| 5,269,269 | 12/1993 | Kreuter ............................ 123/90.11 |
| 5,690,064 | 11/1997 | Izuo ................................. 123/90.11 |
| 5,941,201 | 8/1999 | Shimizu et al. .................. 123/90.11 |
| 6,125,803 * | 10/2000 | Hattori et al. .................... 123/90.11 |

* cited by examiner

*Primary Examiner*—Weilun Lo
(74) *Attorney, Agent, or Firm*—Quarles & Brady LLP

(57) ABSTRACT

An electrically actuated engine valve provides an armature having one or more teeth extending outward from the armature along the actuation axis to be received by corresponding sockets in the cores of opposed electromagnets. The teeth do not restrain the movement of the armature but in approaching the cores provides a magnetic flux path that produces a more constant force of attraction during actuation of the valve. This enables the valves to overcome initial opposing forces such as caused by pressure on the valve heads to which the armature is attached and provides a path of inductive coupling between the opposed coils that can reveal armature position providing a method of accurately controlling armature seating speed.

14 Claims, 3 Drawing Sheets

FIG. 1
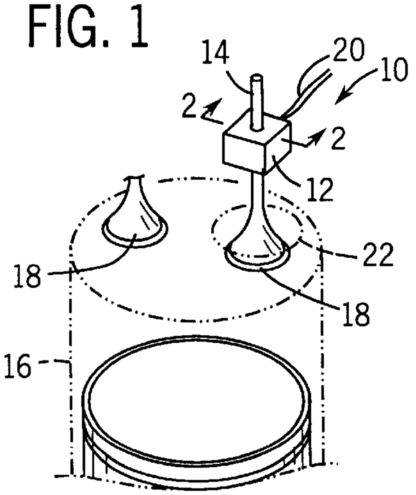
FIG. 2
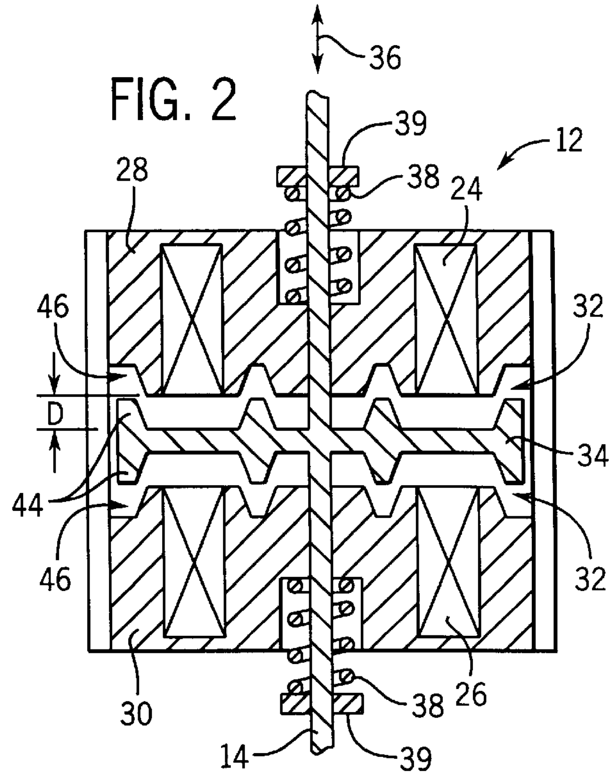
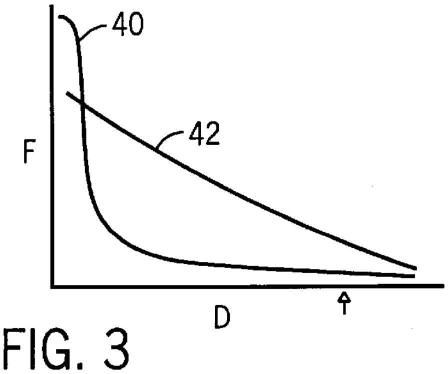
FIG. 3
FIG. 4a
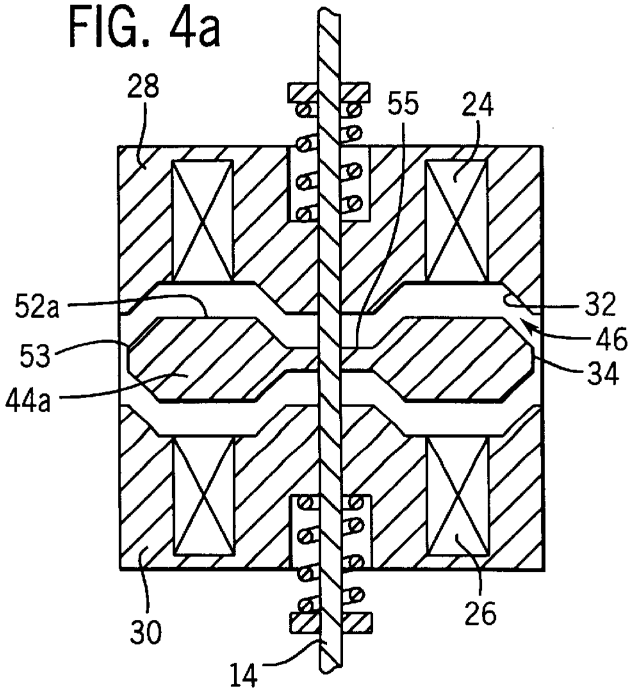

FIG. 4b
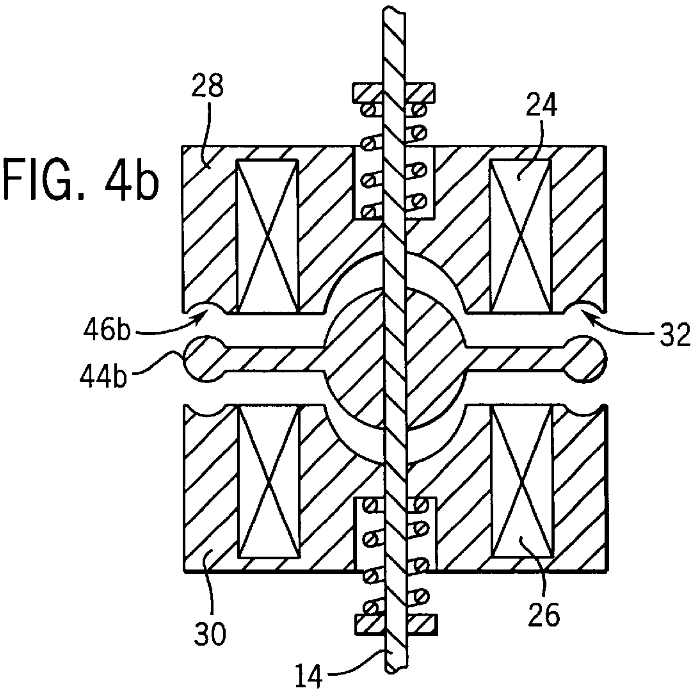
FIG. 5
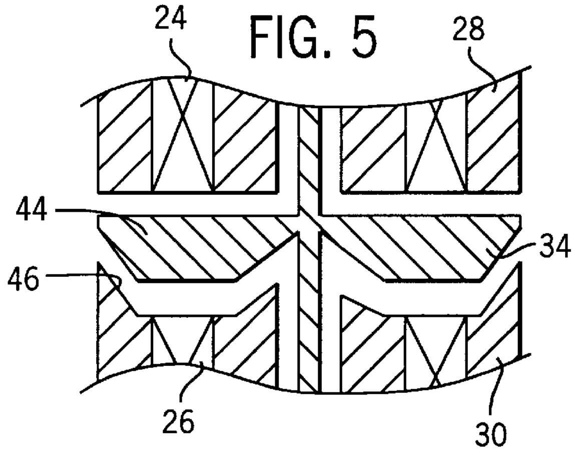
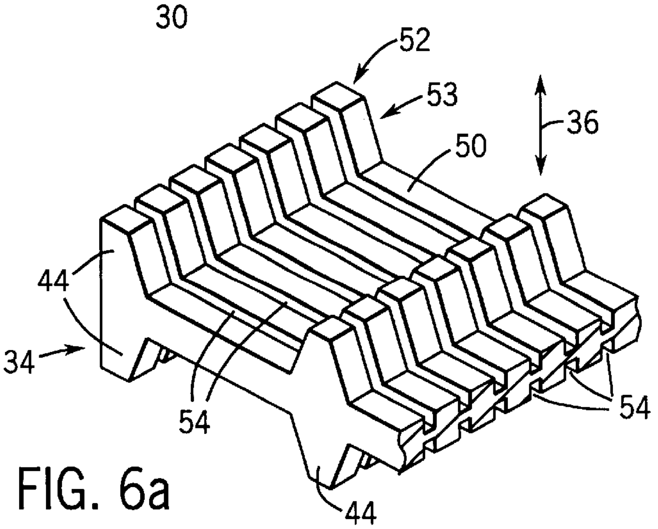
FIG. 6a

ACTUATOR FOR ENGINE VALVE WITH TOOTH AND SOCKET ARMATURE AND CORE FOR PROVIDING POSITION OUTPUT AND/OR IMPROVED FORCE PROFILE

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to actuators for moving the intake and exhaust valves of internal combustion engines, and specifically to an electronically actuable engine valve providing improved force characteristics and a signal indicating the valve position.

Electrically actuable valves, in contrast to valves actuated mechanically by cams and the like, allow a computer-based engine controller to easily vary the timing of the valve opening and closing during different phases of engine operation.

One type of actuator for such a valve provides a flat plate armature which moves back and forth between two electromagnets. The armature is attached to a valve stem of a valve.

When the electromagnets are unpowered, the armature is held in equipoise between the two electromagnets by two opposing springs. Prior to operation, the armature is drawn against one of the electromagnets by an "initialization" current in the retaining electromagnet. The spring between the armature and the retaining electromagnet is compressed while the opposing spring is stretched. Once the armature is drawn fully toward the receiving electromagnet, the initialization current is reduced to a "holding" level sufficient to hold the armature against the electromagnet until the next transition is initiated.

A change of valve state from open to closed or vice versa, is effected by interrupting the holding current. When this occurs, the energy stored in the opposed compressed and stretched springs accelerates the armature off of the releasing electromagnet toward the new receiving electromagnet. When the armature reaches the receiving electromagnet, that electromagnet is energized with the "holding" current to retain the armature in position against its surface.

In a frictionless system, the armature reaches a maximum velocity at the midpoint between the two electromagnets (assuming equal spring forces) and just reaches the receiving electromagnet with zero velocity. In a physically realizable system in which friction causes some of the stored energy of the springs to be lost as heat, the armature will not reach the receiving electromagnet unless the energy lost to friction is replaced. This is accomplished by creating a "capture" current in the receiving electromagnet prior to the armature contacting that electromagnet.

The capture current must be of sufficient magnitude to overcome the opposing forces resisting movement of the armature, however, it is equally important that the capture current be limited to prevent damage to the armature, electromagnet, or valve and to limit impact noise. If the capture current is turned on too soon (or is too great in magnitude), the armature may be accelerated into the electromagnet (and the valve into its seat) at excessive velocity. Conversely, the armature may not be captured by the receiving electromagnet and the valve may not close if the capture current is turned on too late or is too low in magnitude.

Accurate control of the capture current is facilitated if the position and velocity of the armature as it approaches the receiving electromagnet can be measured. Because the force between the electromagnet and armature varies rapidly with distance, sensors for measuring armature distance must be very accurate. Small measurement errors in distance can produce large errors in the calculated force applied to the armature, upsetting correct armature control.

Unfortunately, position sensors that are sufficiently accurate for this purpose and yet robust enough to survive in the environment of an internal combustion engine are expensive and therefore impractical.

BRIEF SUMMARY OF THE INVENTION

The present invention provides inter-engaging teeth and sockets on opposing armature and electromagnet core faces to reduce the variation in the force of attraction between the armature and a core. As the force profile of the actuator becomes more linear, the demands on the position sensor are reduced and peak initialization and capture currents are reduced. In addition, the teeth and socket structure creates a mutual inductance between opposed electromagnets that may be measured to derive armature position.

Specifically, then, the present invention provides an electrically actuable engine valve having a first and second coil wound about a common actuation axis and spaced apart by an actuation distance. A first and second core, incorporating the first and second electromagnets, respectively, present opposed core faces across the actuation distance. A valve having a valve head sized to cover a valve seat of an internal combustion engine is attached to a valve stem, the latter supported by valve stem supports holding the valve stem aligned with the actuation axis for movement along the actuation axis. An armature plate extends in a plane perpendicular to the axis and attaches to the valve stem for movement therewith along the actuation axis. At least one spring is attached to the armature plate to bias the armature plate to a neutral position between the core faces. The armature plate and at least one given core have a mating tooth and socket extending parallel to the actuation axis, the tooth and socket sized to provide a more linear relationship in the attractive force between the given core and the armature as a function of separation distance between the given core and the armature for a constant coil current.

Thus it is one object of the invention to provide a more linear attractive force between the armature and the core as a function of distance thereby providing better initialization of the armature position and improved control of armature position and speed.

The tooth may be on the armature plate and the socket on the core or the socket may be on the armature plate and the tooth on the core.

Thus it is an advantage of the invention that it provides flexibility in design as may be necessary to minimize armature weight or maximize armature flux path.

The tooth and the socket may be on only one side of the armature and a corresponding surface of the core.

Thus it is another object of the invention to provide different force profiles for the two sets of coils, which will be suitable for the actuation of an exhaust valve since the exhaust gases provide additional resisting force on the opening of the valve.

The armature plate may include a plurality of slots extending along the actuation axis.

Thus it is another object of the invention to reduce induced eddy currents in the armature plate such as cause resistive losses.

The foregoing and other objects and advantages of the invention will appear from the following description. In this description, reference is made to the accompanying drawings, which form a part hereof, and in which there is shown by way of illustration, a preferred embodiment of the invention. Such embodiment does not necessarily represent the full scope of the invention, however, and reference must be made therefore to the claims for interpreting the scope of the invention.

BRIEF DESCRIPTION OF THE DRAWINGS

FIG. 1 is a phantom, fragmentary perspective view of a cylinder head and its valve assembly showing location of the electromagnet actuator of the present invention;

FIG. 2 is a cross-section of the electromechanical actuator of FIG. 1 taken along lines 2—2 showing an armature attached to a valve stem and positioned between two coils;

FIG. 3 is a graph depicting force of attraction between an actuated coil and the armature of the present invention for a prior art planar armature and for the tooth and socket armature of the present invention showing the greater linearity of force as a function of distance for the latter;

FIGS. 4*a* and 4*b* are fragmentary cross-sections similar to FIG. 2 showing alternative embodiments of the tooth and socket design of the present invention;

FIG. 5 is a fragmentary cross section similar to that of FIG. 2 showing an asymmetric armature plate useful for exhaust valves;

FIG. 6*a* is a fragmentary perspective view of a rectangular version of the armature plate of FIG. 2 showing parallel surface slots to reduce eddy current flow;

DETAILED DESCRIPTION OF THE INVENTION

Figure 6B:
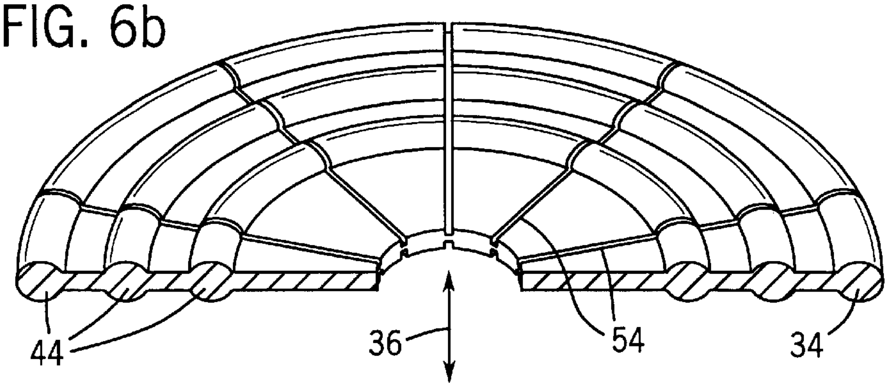
FIG. 6*b* is a fragmentary perspective view of a circular version of the armature plate of FIG. 2 showing radial surface slots to reduce eddy current flow.

Referring now to FIG. 1, an electromagnetically actuated valve 10 suitable for use with the present invention provides a coil assembly 12 fitting around a valve stem 14, the latter which may move freely along its axis. The valve stem 14 extends downward from the coil assembly 12 into a piston cylinder 16 where it terminates at a valve head 18. Generally, power applied via leads 20 of the coil assembly 12 will move the valve head 18 toward or away from a valve seat 22 within the cylinder so as to provide for the intake of air and fuel or recirculated exhaust gas, or exhaust of exhaust gas depending on the engine and valve type.

Referring now to FIG. 2, the coil assembly 12 provides two toroidal coils 24 and 26 of helically wound electrical wire. The coils 24 and 26 are spaced apart coaxially along the valve stem 14 and fit within cores 28 and 30, respectively, which provide for the concentration of magnetic flux at opposed open faces 32 when the coils 24 and 26 are energized.

Between the open faces 32 of the cores 28 and 30 is a disk-shaped armature plate 34 attached to the valve stem 14. The armature plate 34 may be a solid soft iron plate for easy manufacturing and high magnetic attraction. The surface of the armature plate 34 extends perpendicularly to the axis of the valve stem 14. The space between the open faces 32 is sufficient so that the valve stem 14 may move by its normal range along actuation axis 36 before the armature plate 34 is stopped against either the open faces 32 of core 28 or core 30.

Helical compression springs 38 extend outward from the cores 28 and 30 away from the armature plate 34 about the valve stem 14 to be constrained by collars 39 on the valve stem 14. Absent the application of current to either of coils 24 and 26, the springs 38 bias the armature plate 34 to a point approximately midway between the cores 28 and 30.

Referring now to FIG. 3 for prior art valves similar to that of FIG. 2 but having a planar armature plate 34, the function 40, relating force of attraction between the armature plate 34 and an energized one of the cores 28 or 30 to distance between the armature plate 34 and that cores 28 or 30 for a constant current through the cores 28 or 30, varies abruptly as a function of distance, the force decreasing rapidly in the first few millimeters of separation. This rapid fall-off in force with distance makes it extremely hard to produce sufficient force to initially attract the armature plate 34 to one of the cores 28 and 30. Further the non-linearity makes control of the velocity of the armature plate difficult.

The present invention, in contrast, provides a more nearly linear function 42 relating force to distance between the armature plate 34 and the cores 28 or 30 of an energized one of coils 24 or 26. This function 42 is much more constant providing greater forces at greater distances between the armature plate 34 and cores 28 or 30 and less variation in force for a given current as may provide greater precision to control the armature velocity.

Referring again to FIG. 2, the greater linearity of force provided by the present invention results from the use of one or more teeth 44 extending along the actuation axis 36 out from the broad surfaces of the armature plate 34 toward corresponding open faces 32 of the cores 28 and 30. The cores 28 and 30 have sockets 46 corresponding to the teeth 44 to interfit with the teeth 44 as the armature plate 34 moves toward either of the respective open faces 32. Importantly, the sockets 46 are in the cores 28 and 30 and the coils 24 and 26 are not affected and remained encased in cores 28 and 30.

Referring now to FIGS. 2 and 6*a*, teeth 44 extending outward along the actuation axis from a base 50 of the armature plate 34, the base 50 being generally a portion of the armature plate 34 aligned with the coils 24 or 26. The teeth are generally trapezoidal in cross section, having sloped walls 53 terminating at a plateau tip 52.

The height of the teeth 44 from base 50 to tip 52 substantially equals the separation between the base 50 and the opposing portion of the core 28 or 30 when the armature plate 34 is in a neutral position biased by the springs 38 with no energizing either of the coils 24 and 26. Thus the tips 52 of the teeth 44 nearly engage their corresponding sockets 46 prior to powering of either coil 24 or 26. Other heights may also be selected among those that render the force function 40 more linear. Generally however, the height of the teeth 44 will be considerable and at least half the distance between the base 50 and the portion of the open faces 32, which it abuts. Precise shaping of the teeth 44 and sockets 46 may be determined with commercially available finite elements magnetic device modeling programs.

Referring still to FIG. 6*a*, the broad surfaces of the armature plate 34 may be scored with a plurality of longitudinal slots 54 extending into the surface of the armature plate 34 along the actuation axis 36 to break the path of eddy current flows which may tend to run cyclically around the surface of the armature plate 34 dissipating energy as resistive heating. These slots 54 may be filled with an electrically insulating material or left open and may run at a variety of orientations around the surface generally across to the expected path of such eddy currents. Reduction of eddy current losses is particularly important because of the high electromagnetic transience necessary for the operation of a valve of this kind. Winding structure and wire geometry with reduced proximity loss and eddy current loss may also be used.

Referring now to FIG. 6*b*, in an alternative embodiment the armature plate 34 is disk shaped and has multiple annular teeth 44 which correspond with multiple sockets 46 on the cores 28 and 30 (not shown). In this case the slots 54 extend radially.

Referring now to FIGS. 4*a* and 4*b*, alternative versions of the teeth 44 and sockets 46 may be provided. In FIG. 4*a*, teeth 44*a* may be positioned symmetrically about the valve stem 14 centered on the windings of a coil (e.g. 24). The plateau tips 52*a* of the teeth 44*a* are as wide as the windings of the coil 24 and the sloped walls 53*a* cover the remainder of the open face 32*a* leaving minimal base 50 close to the valve stem 14. Sockets 46*a* are formed in the open face 32 of the core 28 and hold each of the windings of the coil 24 at their deepest portions and are shaped corresponding to the teeth 44*a*.

Referring to FIG. 4*b*, in an alternative embodiment, the teeth 44*b* have hemicircular cross-sections (similar to the teeth of FIG. 6*b*) as opposed to the trapezoidal cross sections. As in the embodiment of FIG. 2, the teeth 44*b* flank the windings of the coil 24 so that the windings are positioned in between sockets 46*b*. In each of the embodiments of FIGS. 4*a* and 4*b*, no change in the basic dimensions of the windings of coils 24 and 26 is required and they remain encased in the cores 28 and 30.

Referring now to FIG. 5, the armature plate 34 may be asymmetric across a bisecting plane perpendicular to the valve stem 14 with the teeth 44 extending on only one side of the armature plate 34 toward sockets 46 on only one core 30 and wherein the opposite side of the armature plate 34 and its opposing core 28 is planar. In this way, armature mass is reduced and fabrication simplified while improved actuation force is provided toward core 30 which may preferably be the lower core of cores 28 and 30 allowing improved opening, for example, of an exhaust valve where exhaust back pressures resist that opening and greater initial forces are required.

Figure 7:
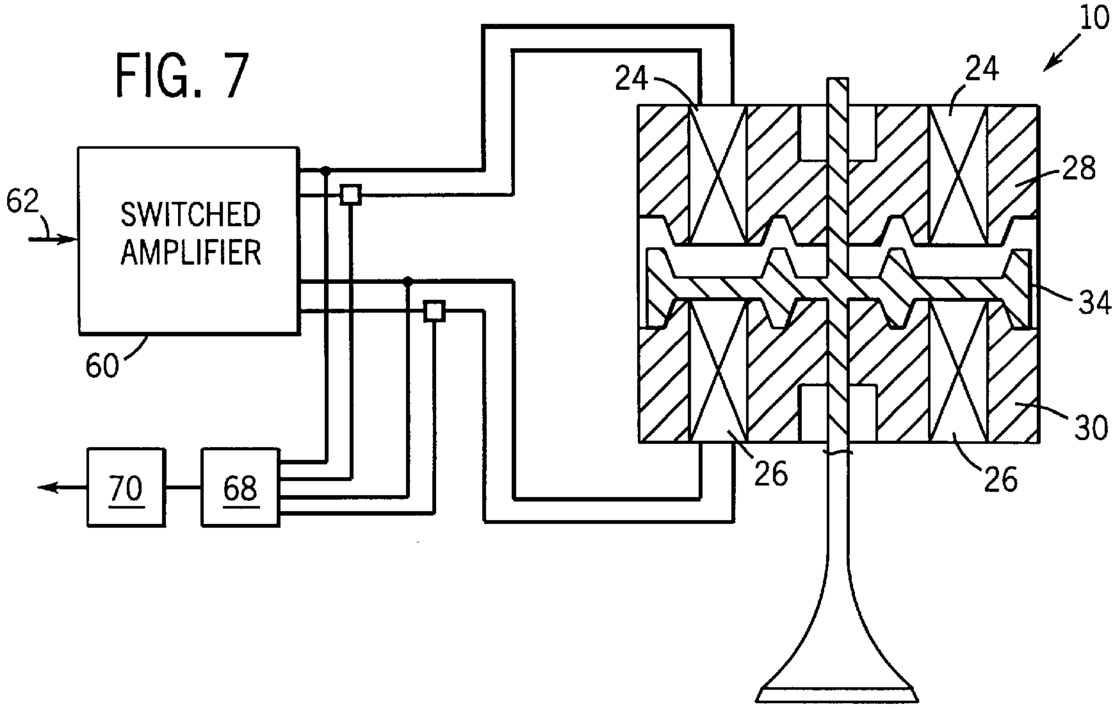
FIG. 7 is a block diagram of a controller useful for use with the actuator of FIG. 1 for alternately driving one coil and reading induced voltage in the second opposed coil for armature control.

Referring now to FIG. 7, the operation of the teeth 44 and sockets 46 such as provide an interdigitation of the armature plate 34 and the cores 28 and 30 promotes a mutual inductance between an activated one of the coils 24 and the other inactivated coil 26 or visa versa. This mutual inductance is dependent on the position of the armature plate 34 with respect to those coils 24 and 26 and the armature plate 34, which serves as a magnetic pathway between these two coils 24 and 26. Accordingly, a measure of the mutual inductance may be used to determine the position of the armature plate 34.

During activation of one coil (24 for example) by means of a switching amplifier 60 producing a fluctuating magnetic field, an induced current will be detectable in the other coil 26 dependent on the proximity of the armature plate 34 to that coil 26. The switching amplifier 60 may be a hysteretic amplifier switching current to the coil 24 on and off in a varying duty cycle to control the average current to a predetermined amount dictated by a s control signal 62 indicating that the valve should be opened or closed.

Both of the coils 24 and 26 are connected to a mutual inductance calculator 68 receiving a measure of drive current through the coil 24 and induced voltage across the coil 26 to deduce a measure of mutual inductance. This measure may be provided to a look-up table 70 to be related to an armature position according to empirically derived table entries. The armature position is provided to a controller (not shown) which uses it to allow sophisticated control of the valve operation.

Figure 8:
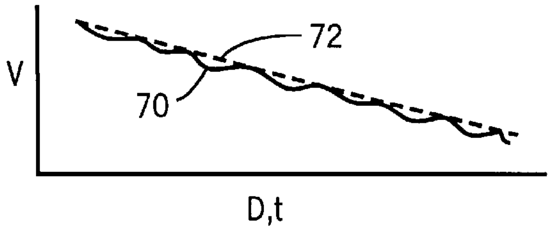
FIG. 8 is a simplified graph of voltage versus armature distance from the unpowered coil showing the decreasing amplitude of coupled voltage to the unpowered coil as the armature moves toward the driven coil when the coil that is driven is driven with an alternating current such as produced by a hysteretic controller.

Generally, as shown in FIG. 8, the mutual inductance calculator 68 will see a voltage curve 70 following a decreasing envelope 72 as the armature plate 34 moves toward the activated coil 24. This envelope 72 may be compared by the mutual inductance calculator 68 to the current output to the coil 24 by the switching amplifier 60 (which is also varying according to the signal 62 received by the switching amplifier 60 to control armature plate velocity) and the relationship between current and voltage is used to deduce the mutual inductance and hence the position of the armature plate 34. This position is used by a valve controller (not shown) to control armature plate velocity. Depending on that velocity, the drive current to coil 24 may be increased or decreased to provide for a soft seating of the valve.

Generally the position signal will be used to decrease the current drive as the armature plate 34 approaches the respective coil so that the armature plate and electromagnet will contact at zero velocity. Subsequent to that time, a holding current less than the capture current used to draw the armature plate 34 in is used to hold the armature plate 34 in position making use of the far greater forces that exist when the electromagnet armature plate contacts. Other more complex control strategies may be enabled by this system.

Upon seating of the valve and a contacting of the armature plate 34 against the core 28, a holding current is maintained as is understood in the art until the time when the valve state is to be changed and switching amplifier 60 output to coil 24 is turned off. The valve controller (not shown) will then provide a signal to the switching amplifier 60 to connect to coil 26 via an internal commutator formed of solid state switches as is understood in the art. Now the process is reversed with coil 24 serving to provide a position measurement of the armature plate 34 as it is drawn to coil 26.

The teeth 44 and sockets 46 provide improved inductive coupling between the two coils 24 and 26 thus rendering this technique practical and provide increased linearity of the forces exerted on the armature plate 34 by the respective coils 24 and 26 rendering improved control of the armature motion possible.

The above description has been that of a preferred embodiment of the present invention, it will occur to those that practice the art that many modifications may be made without departing from the spirit and scope of the invention. For example, it will be understood that an auxiliary coil may also be used for the purpose of measuring mutual inductance or other magnetic sensing means. In order to apprise the public of the various embodiments that may fall within the scope of the invention, the following claims are made.

What is claimed is:

1. An actuator for use with an engine valve, the valve having a valve stem and a valve head, the valve head sized to cover a valve seat of an internal combustion engine, the actuator comprising:

a first and second coil receiving a coil current and opposed along a common actuation axis and spaced apart by an actuation distance;

a first and second core incorporating the first and second coils, respectively, and presenting opposed core faces across the actuation distance;

valve stem supports holding the valve stem aligned with the actuation axis for movement along the actuation axis;

an armature plate extending in a plane perpendicular to the actuation axis and attached to the valve stem for movement therewith along the actuation axis;

at least one spring attached to the armature plate to bias the armature plate to a neutral position between the core faces; and wherein the armature plate and a core face of at least one core have a mating tooth and socket extending parallel to the actuation axis, the tooth and socket sized to provide a more constant relationship in the attractive force between the core and the armature as a function of separation distance between the core face and the armature for a constant coil current.

2. The actuator of claim 1 wherein the tooth is on the armature plate and the socket is on the core.

3. The actuator of claim 2 wherein the socket is centered about the coil of the core.

4. The actuator of claim 1 wherein the tooth is on the core and the socket is on the armature plate.

5. The actuator of claim 4 wherein the tooth surrounds the coil of the core.

6. The actuator of claim 1 including multiple teeth and sockets radially displaced with respect to the valve stem on mating portions of the core face and armature inside and outside the radial position of the coil.

7. The actuator of claim 1 wherein the valve is attached to the armature to move away from the valve seat when the armature plate moves toward a lower core and wherein the tooth and socket are on facing portions of the armature plate and lower core only.

8. The actuator of claim 1 wherein the armature plate is symmetric about a plane perpendicular to the actuation axis.

9. The actuator of claim 1 wherein the armature plate further includes a plurality of slots extending into the armature plate across a direction of eddy current flow as induced by a magnetic field produced by the coil current.

10. The actuator of claim 1 including further:

a switching amplifier receiving a valve control signal to produce the coil current for a first of the coils;

a mutual inductance calculator communicating with a second of the coils to sense a decrease in mutual inductance from a coupling between the second coil and the first coil as a function of armature position to provide a position output indicating armature position.

11. The actuator of claim 10 wherein the switching amplifier further includes an input related to the position output to modify the coil current thereby to control armature velocity.

12. The actuator of claim 10 wherein the mutual inductance calculator corrects the position output to compensate for modifications of the coil current made by the switching amplifier.

13. The actuator of claim 10 wherein the switching amplifier produces a switched coil current.

14. The actuator of claim 10 wherein the switching amplifier includes further a commutator switching the drive current to different coils according to the valve control signal received by the switching amplifier.

* * * * *